United States Patent
Meyer

(10) Patent No.: US 7,018,187 B2
(45) Date of Patent: Mar. 28, 2006

(54) APPARATUS FOR SMOOTHING AND COOLING A SYNTHETIC RESIN WEB PRODUCED BY A SLIT NOZZLE

(75) Inventor: Helmut Meyer, Troisdorf (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 95 days.

(21) Appl. No.: 10/631,476

(22) Filed: Jul. 31, 2003

(65) Prior Publication Data

US 2004/0058028 A1 Mar. 25, 2004

(30) Foreign Application Priority Data

Aug. 3, 2002 (EP) .................................. 02017440

(51) Int. Cl.
*B29C 47/88* (2006.01)
(52) U.S. Cl. .................. 425/72.1; 425/327; 425/378.1; 425/379.1
(58) Field of Classification Search .............. 425/72.1, 425/378.1, 379.1, 446, 308, 224, 377, 315, 425/325, 394, 327; 264/141, 175, 237, 211.13
See application file for complete search history.

(56) References Cited

U.S. PATENT DOCUMENTS

| 4,056,592 | A |   | 11/1977 | Izumi et al. |
| 4,874,571 | A |   | 10/1989 | Müller |
| 5,091,134 | A | * | 2/1992 | Oshima et al. .......... 264/176.1 |
| 5,423,671 | A | * | 6/1995 | Imataki ....................... 425/327 |
| 6,187,422 | B1 |  | 2/2001 | Murschall et al. |
| 6,619,941 | B1 | * | 9/2003 | Smith et al. ............... 425/72.1 |

FOREIGN PATENT DOCUMENTS

| DE |    414 141 |  6/1960 |
| DE | 197 52 501 |  6/1999 |
| DE | 198 26 063 | 12/1999 |
| EP |   59029125 |  2/1984 |
| EP |  1 149 684 | 10/2001 |

* cited by examiner

*Primary Examiner*—Robert B. Davis
(74) *Attorney, Agent, or Firm*—Herbert Dubno

(57) ABSTRACT

An apparatus for smoothing and cooling of slit nozzle synthetic web passes the web following the smoothing gap between two rollers along a cooled surface and into contact with cold air introduced by cold air chamber open toward the roller surface.

9 Claims, 2 Drawing Sheets

APPARATUS FOR SMOOTHING AND COOLING A SYNTHETIC RESIN WEB PRODUCED BY A SLIT NOZZLE

FIELD OF THE INVENTION

My present invention relates to an apparatus for smoothing and cooling a synthetic resin (thermoplastic) web as produced by a slit nozzle, also referred to as a flat-sheet nozzle or die or a slot die.

BACKGROUND OF THE INVENTION

A synthetic resin web which is produced by a slit nozzle is generally smoothed and used as a packaging material. The plastic films for this purpose should have a high degree of transparency. The transparency, however, is dependent on the ratio of the crystallization speed to the speed at which the web is cooled down. A high cooling rate, as a rule, produces plastic film of relatively high transparency. Thus it is desirable to cool such plastic webs as rapidly as possible and with as high a temperature gradient or heat extraction rate as is possible.

In the standard practices, the synthetic resin web emerging from the slit nozzle or slot die is passed through a smoothing and cooling gap which can be defined on the one hand by a cooled smoothing roller or roll and, on the other hand, by a portion of the periphery of a smoothing roll over which a cooled endless belt is passed. The endless belt passes around rerouting rollers at its opposite ends and each of these rerouting rollers may be a cooled roller.

In the use of an endless belt in the manner described it is found that after the plastic web has been contacted by the upstream cooling roller of the belt, there is a tendency for the plastic web to pick up heat rapidly although it lies in contact with the belt between the rerouting rollers.

In other words, the plastic web tends to be reheated during contact with the endless belt and before it again passes into contact with the second cooling roller of the belt. The smoothing effect is largely unsatisfactory in such causes. The surface of the plastic web is generally found to be detrimentally effected by this property of the endless belt system.

Furthermore, when the endless belt, as is not uncommon, has some irregularity like for example a weld seam, corresponding undesirable markings are found in the plastic web. Since the cooling effect with this system is less than satisfactory and marking can occur, the system has been found to be undesirable for producing plastic film of high transparency.

OBJECTS OF THE INVENTION

It is the principal object of the present invention to provide an apparatus which will overcome these drawbacks and which will provide both an optimum smoothing effect and a high degree of cooling or high cooling speed so that the webs or foils which are produced have a high degree of transparency.

Another object of the invention is to provide an apparatus for making a synthetic resin web which will more effectively cool and smooth the web and whereby drawbacks of earlier systems are avoided.

SUMMARY OF THE INVENTION

These objects are attained, in accordance with the invention in an apparatus for smoothing and cooling a plastic web or layer produced by a slit nozzle or slot die, whereby a smoothing device comprised of at least one first smoothing roll and at least one second smoothing roll is provided to smooth the plastic web fed between the two smoothing rolls. Downstream of the smoothing device a cool roll is provided for cooling the plastic web guided over the cooled roll.

Over the surface of the cooled roll or over the plastic web guided over the cooled roll surface, at least one cooling air chamber is provided for directing cooling air against the plastic web.

That the cooled roll is located downstream of the smoothing device, means in accordance with the invention that the latter roll is provided in the direction of feed of the plastic web downstream from the smoothing device. The term "cooling air" is here used to refer generally to any cooled gas which will usually be air.

The invention is based upon my discovery that a highly effective cooling of the plastic web from both sides of the web is possible from the conjoint use of the cooling roller surface and the cooling air chamber. One surface of the plastic web is cooled by contact with the cooled roll surface and the opposite surface of the web is cooled by the cooling air from the cooling air chamber. With this device, plastic film with high transparency can be produced.

Preferably the apparatus is utilized to produce plastic foils with a thickness of less than 200 µm.

More particularly, the apparatus for making a synthetic resin web can comprise:

a slit nozzle for producing a hot synthetic resin layer;

a smoothing device including at least a first smoothing roll and a second smoothing roll forming a nip through which the synthetic resin layer passes;

a cooled roll surface downstream of the nip and along which the synthetic resin layer is guided so that a face of the synthetic resin layer lies in contact with the cooled roll surface; and at least one cooling-air chamber juxtaposed with at least a portion of the synthetic resin layer in contact with the cooled roll surface and open toward an opposite face of the synthetic resin layer, the cooling-air chamber being provided with a source of a cooling gas for passing the cooling gas into contact with the opposite face of the synthetic resin layer as the synthetic resin layer travels along the cooled roll surface to smooth and cool a web formed by the layer.

According to a feature of the invention the first smoothing roll and/or the second smoothing roll can be cooled and, advantageously, both the first and second smoothing rolls are cooled.

Furthermore, the second smoothing roll can simultaneously form the cooled roll surface or, as noted earlier, the cooled roll downstream of the smoothing device.

The second cooling roll thus here serves as the cooling surface for the plastic web in the region of the cooling chamber. The plastic web remains, after traversing the smoothing nip between the first and second smoothing rolls, in contact with the cooled second smoothing roll or is partially looped around the second smoothing roll.

Advantageously, the cooling air chamber is juxtaposed directly with the surface of the cooled roll or the plastic web which lies against this furnace. The cooling chamber can have at least one air inlet and at lest one air outlet spaced from the inlet so that the air passing from the inlet to the outlet is directed against the surface of the web. A partition can be provided within the cooling air chamber and can reach close to the surface of the web so that the air is guided through a narrow gap between this partition and the web. In any event, the inlet and outlet for the cooling air are so dispos d that th air encounters the surface of the web before it passes through the outlet.

The cooling air chamber can have walls which close off the chamber except where the chamber is open toward the web and there these walls may define a narrow gap with the web. The gap between the walls of the chamber and the web and between the partition and the web in the radial direction with respect to the cooled roll can be several millimeters.

The cooling air chamber has an opening in the direction of the cooled roll or the web lying thereagainst which extends over at least a portion of the circumference of the cooled roll, preferably at least a twentieth of the circumference (at least 18° of arc) and even more preferably a fifteenth of the circumference (i.e. at least 24° of arc) and even better at least a tenth of the circumference (36° of arc).

In a highly preferred embodiment, the cooling chamber defines a narrow gap with the surface of the cooled roll or the web portion guided therealong and through which the airflows parallel to the surface of the web and/or tangentially to the web and cooled roll. The width of this gap can be adjustable and the gap can be defined by a bar lying in a radial plane of the cooled roll and extending the full length thereof. The preferred gap width is only several millimeters (between 1 and 20 millimeters) and the bar can be adjusted by an appropriate adjusting or setting element.

In a preferred embodiment of the invention the cooling air at the inlet may have a temperature between 10 and 50° C., with 10 to 45° C. being a more satisfactory range and the best temperature lying within the range of 15 to 40° C. It has been found to be desirable to subdivide the cooling air chamber into two compartments or to provide at least two cooling air chambers directly adjacent one another along the segment of the web lying along the cooled roll. The best results have been obtained with only two such cooling air chambers. The web thus passes from the first cooling air chamber into the second cooling air chamber and can be treated in the first chamber with cooling air at a temperature between 5 and 40° C., preferably between 10 and 35° C.

In the second cooling chamber the cooling air can have a temperature between 10 and 50° C., preferably between 15 and 45° C. The temperature in the first cooing air chamber should be lower in the temperature in the second cooling air chamber.

In a preferred feature of the invention, downstream of the cooling chamber, in the direction of displacement of the web, a further smoothing gap can be provided between two smoothing rolls through which the web is passed. These rolls can also be cooling rolls. The second smoothing roll which forms the first nip or gap with the first smoothing roll can form the third nip or gap with a third smoothing roll.

I have found that this configuration provides a unique combination of smoothing and cooling which, surprisingly, leads to exceptionally high transparency of the film. It is especially suitable for plastic webs or films of thicknesses below 200 μm. The adjustability at cooling chamber and the primal cooling chambers allows especially desirable film properties to be obtained and the device to be adjusted so that such properties are obtained reproducible.

The combination of two cooling chambers allows an especially soft cooling to be obtained when different temperature are maintained in the two chambers. The device of the invention is relatively inexpensive and simple and can be reliably used without problems. Existing equipment can be readily retrofitted with the cooling chambers of the invention.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
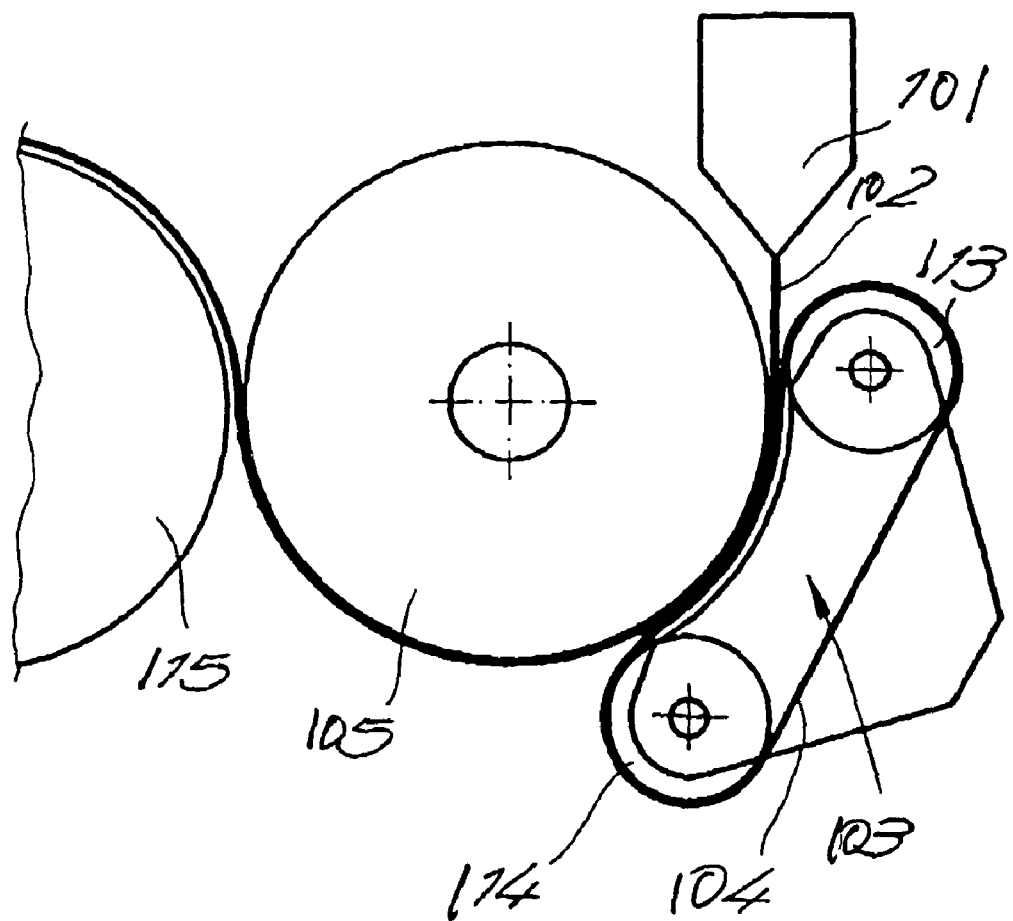
FIG. 1 is a diagrammatic elevational view of a device for the smoothing and cooling of a synthetic resin web according to the prior web.

FIG. 1 shows a prior art device which comprises a slit nozzle, slot dye or flat sheet extruder 101 from which a synthetic resin web 102 emerges in a hot state to pass into a smoothing device 103. The latter is comprised of a cooled smooth roll 105 and an endless belt 104. The endless belt extends over a portion of the periphery of the smoothing roll 5 and bears against the part of the plastic web 2 which is looped around the roll 105. The synthetic resin web 102 then passes through a further smoothing gap between the smoothing rolls 105 and 115. The latter roll is also cooled.

In the prior art construction, the endless belt 104 is first cooled by contact with the cooled roller 113 before it comes into contact with the plastic web 2.

Figure 2:
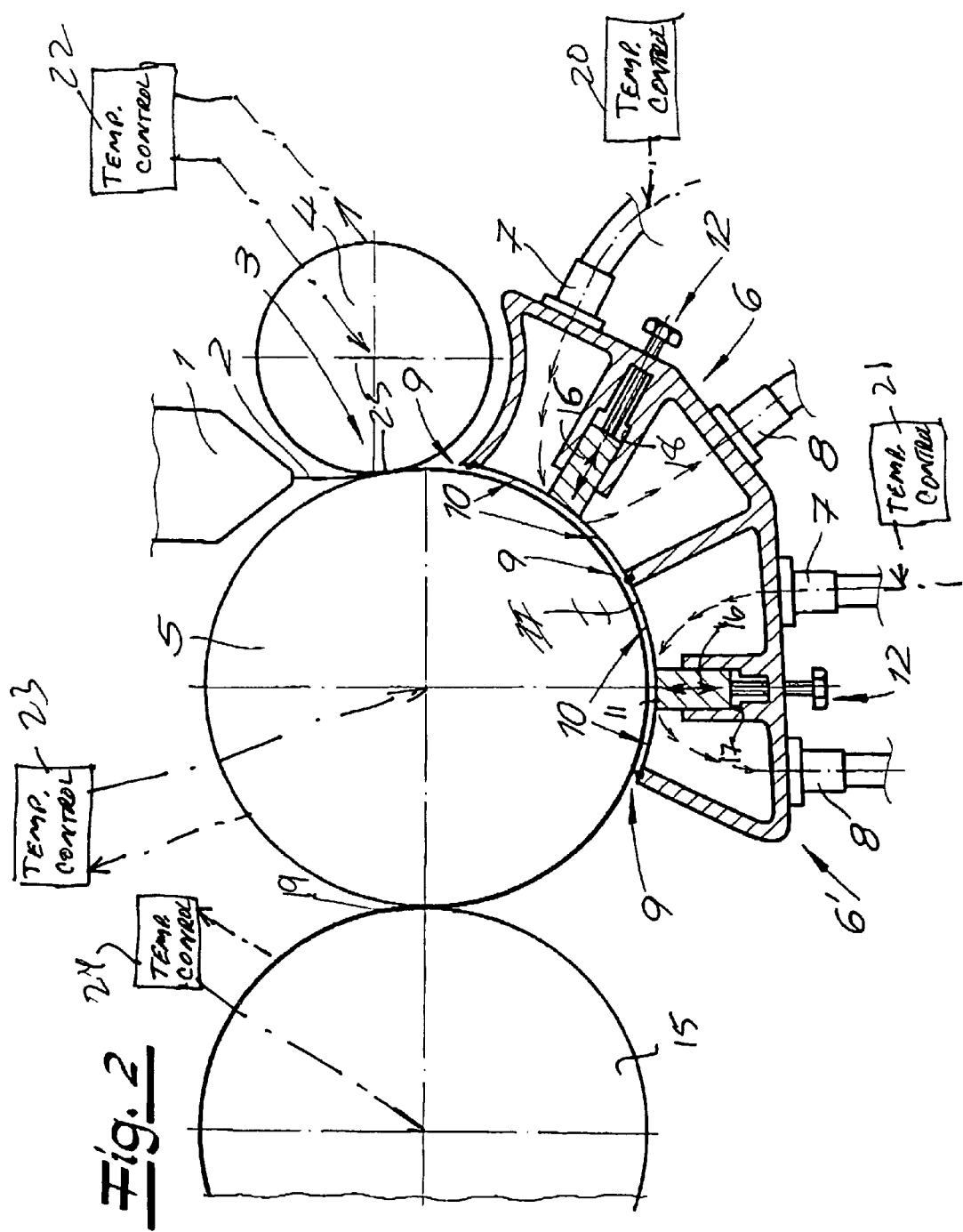
FIG. 2 is a transverse section through a device for cooling and smoothing a web in accordance with the invention.

The belt, moreover, heats up relatively quickly after it leaves the roller 113. The result is that the cooling of the web by the belt is not reliable. Furthermore, a reliable smoothing effect cannot be assured either. The belt 104 passes over the cooled roller 114 before returning to the roller 113. By contrast, FIG. 2 shows the device according to the invention in which the slit nozzle or slot die 1 produces the synthetic resin web 2 which passes into the smoothing device 3. The latter is comprised of a first smoothing rolling 4 and a second smoothing roll 5.

Both smoothing rolls 4, 5 are cooled and have, for example, temperatures between 10° and 25° C.

Downstream of the smoothing device 3 and hence the gap, the synthetic resin web 2 loop around the cooled second smoothing roller. This smoothing roller 5 corresponds in FIG. 2 in the preferred embodiment of the invention to the cold roller against which the web 2 is pressed so that that web is cooled on its face in contact with the smoothing roller 5.

Over the surface of the cooling roll 5 which is contacted by the web, i.e. over the length of the cooling roll in contact with the web, two cooling chambers 6, 6' are provided in succession. In the cooling chambers 6, 6', cooling air is directed against the surface of the web.

More particularly, it can be seen from FIG. 2 that the chambers 6 and 6' open directly toward the surface of smoothing roll 5 and thus the face of the web 2 which is turned away from the face which was contacted by the web. Each chamber has an air inlet 7 and an air outlet 8 and a partition 16 which extends radially between the inlet and the outlet so that the air in the chamber is directed toward and guided along the web.

The flow direction of the air has been represented by arrows. The cooling chambers 6 and 6' are open toward the web 2 and are closed on all sides except the side turned toward the web.

Between the cooling chambers and the web only a small gap 9 enabling passage of the web 2 is provided. From FIG. 2 it can be seen that openings 10 of the chambers 6, 6' toward the periphery of the roll 5 extend over a substantial fraction of the arc length of the circumference of the roll 5, preferably more than a tenth of the periphery of this roll.

The air gaps 11 between the web and the partitions 16 through which the air pass, extend parallel to the web so that the air flowthrough these gaps is likewise parallel to the webs. The gap width of the gap 11 can be adjusted on the setting elements (screws) 12 which displace the bars 16 in channels 17 and 18.

The setting elements 12 can be threaded spindles. As will also be apparent from FIG. 2 the web 2 passes downstream of the chamber 6' through the nip 19 between the roller 15 and the roller 5. The temperature control units 20 and 21 are provided to control the cooling air temperatures admitted to the chambers 6 an 6' while temperature control units 22, 23, 24 serve to control the cooling of the rolls.

In a preferred embodiment of the invention, the temperature at the air inlet 7 of the chamber 6 should be 15 to 30° C. while the temperature of the air admitted to chamber 6' is 20° to 40° C.

The temperature in the first chamber 6 is thus lower than that in the second chamber 11' with the aid of the two cooling chambers 6 and 6' and the ability to control the temperatures in the chambers, an effective cooling of the web 2 is possible. The smoothing is accomplished here through the two cooling gaps 19 and 25 and the third smoothing roll 15 is likewise cooled, preferably to a surface temperature between 10° and 25° C.

I claim:

1. An apparatus for making a synthetic resin web comprising:
   a slit nozzle for producing a hot synthetic resin layer;
   a smoothing device including at least a first smoothing roll and a cooled second smoothing roll forming a nip through which the synthetic resin layer passes;
   a cooled roll surface of said second smoothing roll downstream of said nip and along which said synthetic resin layer is guided so that a face of said synthetic resin layer lies in contact with said cooled roll surface; and
   the cooling-air chambers juxtaposed with at least a portion of said synthetic resin layer in contact with said cooled roll surface and open toward an opposite face of said synthetic resin layer, said cooling-air chambers being provided in succession in a direction of travel of said layer, each of said cooling-air chambers having a source of a cooling gas for passing said cooling gas into contact with said opposite face of said synthetic resin layer as said synthetic resin layer travels along said cooled roll surface to smooth and cool a web formed by said layer, each cooling-air chamber having a respective air inlet and an air outlet and being configured so that cooling air after passing into contact with the web is discharged to said outlet, the cooling air temperatures in said chambers being different from one another.

2. The apparatus as defined in claim 1 wherein each of said cooling-air chambers extends over at least a part of the periphery of said cooled roll surface.

3. The apparatus as defined in claim 2 wherein an air gap is provided between the inlet and the outlet of each of said chambers through which the air from said inlet is guided from said web to said inlet.

4. The apparatus as defined in claim 3 wherein said air gap is adjustable.

5. The apparatus according to claim 4, further comprising means whereby one of said chambers is supplied with air at a temperature between 10° to 50° C.

6. The apparatus as defined in claim 5 wherein said means is adapted to supply air at a temperature between 10° and 45° C.

7. The apparatus defined in claim 1 wherein a first of said chambers is maintained at a temperature between 5° and 40° C.

8. The apparatus as defined in claim 1 wherein said first of said chambers is maintained at a temperature between 5° and 40° C. and a second of said chambers is maintained at a temperature between 10° and 50° C.

9. The apparatus defined in claim 1 herein said first of said chambers is maintained at a temperature between 10° and 35° C. and said second of said chambers is maintained at a temperature between 15° and 45° C.

* * * * *